H. C. GRANT.
ELECTRIC MOTOR.
APPLICATION FILED JAN. 22, 1908.
931,416.
Patented Aug. 17, 1909.
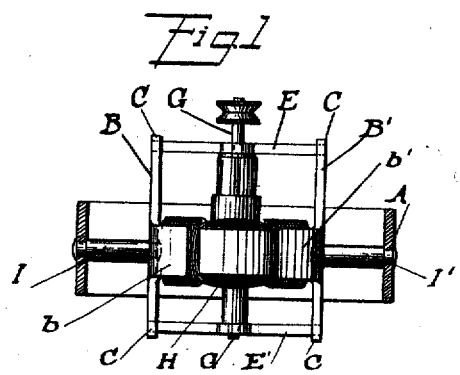
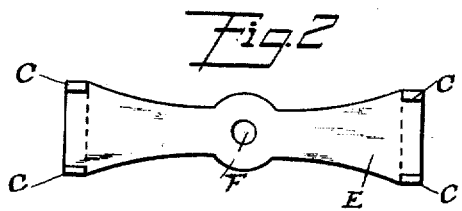
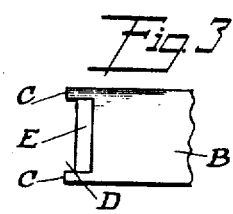
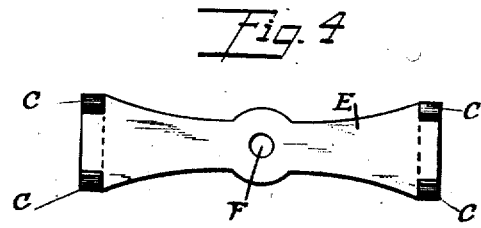
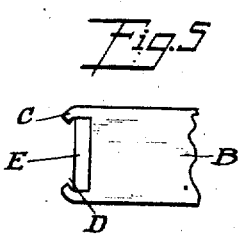
Witnesses:
Inventor
Harry C. Grant

UNITED STATES PATENT OFFICE.

HARRY C. GRANT, OF BAYONNE, NEW JERSEY, ASSIGNOR, BY MESNE ASSIGNMENTS, TO THE LIONELL MANUFACTURING COMPANY, A CORPORATION OF CONNECTICUT.

ELECTRIC MOTOR.

No. 931,416.     Specification of Letters Patent.     Patented Aug. 17, 1909.

Application filed January 22, 1908. Serial No. 412,053.

*To all whom it may concern:*

Be it known that I, HARRY C. GRANT, a citizen of the United States, residing at 10 East Thirty-fifth street, Bayonne, New Jersey, have invented certain new and useful Improvements in Electric Motors, of which the following is a specification.

My invention relates to electric motors and particularly to those of toy construction which are made from stamped or pressed sheet metal.

The object of my invention is to provide a construction which will dispense with the use of screws or bolts, and will permit of the parts being joined together by over-lapping certain projections formed integral with one member, over the ends of an adjacent member to effect a strong and durable construction.

The novel features will be set forth in the claims herewith.

Referring to the drawings which form part of this specification,—Figure 1, is a plan view of my improved motor, the outer ring being shown in section so that the construction of the pole pieces may be disclosed. Fig. 2, is a view of one of the bearing support elements illustrated on a larger scale than shown in Fig. 1. Fig. 3, is a view of one of the joints before the metal is bent to permanently hold the elements together. Fig. 4, is a side view of one of the elements in which the shaft bearing is located, held by the two ends of the pole piece elements after the ends of the latter are bent to form the completed joint. Fig. 5, is an end view of one of the bearing elements and front view of a portion of one of the pole piece elements, disclosing the projections formed on the latter, bent over the end of the former to form a completed joint.

A, indicates a ring which is provided with a base flange or plate on the bottom to serve as a support for the motor, the top of the ring being cut away to disclose means for mounting the pole piece elements B and B' respectively, each of which comprises a piece of soft steel stamped from sheet metal and having a curved central portion *b* and *b'* respectively, which serve as pole pieces, and also having extended ends provided with short projections *c—c—c—c*—etc., which form in the ends of each piece B and B' a recess D, in which the ends of the bearing elements E and E' are held and secured therein by bending the projections *c—c*—etc. over same, as illustrated in Figs. 4 and 5.

The members B and B' are each provided with a hole F, which serve as bearings for the ends of the armature shaft G, on which an armature H is mounted to rotate between the poles *b* and *b'*.

The elements B and B' are held at about the center of the ring A, by means of short stud pieces I and I', which are riveted to said elements at their inner ends, and to said ring at their outer ends, as illustrated in Fig. 1.

The structure is simple and rigid, and may be constructed at a minimum of cost, many parts being duplicates of each other, may be assembled in a quick and positive manner, and is neat and ornamental in appearance.

Having thus described my invention, what I claim as new and desire to secure by Letters Patent, is—

1. An electrical motor comprising an armature having a bearing shaft; two pole wire wound magnets having soft metal cores, said cores having extensions to serve as rivets; two pole pieces to form the faces of said poles having central perforations to receive the rivet extensions of said cores, and having four elongated extensions, two of which are bent concentric to the armature shaft and the remaining two extended to receive the armature bearing pieces and having in the ends thereof recesses to receive said bearing pieces, the sides of said recesses being bent over the said bearing pieces when mounted; and bearing pieces for the armature shaft having central perforations for the said shaft, and the ends of said bearing pieces having a squared extension to fit the said recesses provided in the said extensions of the pole pieces.

2. An electric motor comprising an armature having a bearing shaft; two pole wire wound magnets having soft metal cores, said cores having extensions to serve as rivets; two pole pieces to form the faces of said poles having central perforations to receive the rivet extensions of said cores, and having four elongated extensions, two of which are bent concentric to the armature shaft and the remaining two extended to receive the armature bearing pieces and having in the ends thereof recesses to receive said bearing pieces, the sides of said recesses being bent over the said bearing pieces when mounted; and bearing pieces for the armature shaft having central perforations for the said shaft, the ends of said bearing pieces having a squared extension to fit the said recesses provided in the said extensions of the pole pieces, and a ring frame having perforations to receive the said rivet extensions of the said cores.

In testimony whereof, I have signed my name to this specification in the presence of two subscribing witnesses, this twenty-seventh day of December 1907.

HARRY C. GRANT.

Witnesses:
FRANK M. ASHLEY,
A. T. SCHARPS.

Correction in Letters Patent No. 931,416.

It is hereby certified that the name of the assignee in Letters Patent No. 931,416, granted August 17, 1909, upon the application of Harry C. Grant, of Bayonne, New Jersey, for an improvement in "Electric Motors," was erroneously written and printed "The Lionell Manufacturing Company" whereas said name should have been written and printed *The Lionel Manufacturing Company;* and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.* having central perforations for the said shaft, the ends of said bearing pieces having a squared extension to fit the said recesses provided in the said extensions of the pole pieces, and a ring frame having perforations to receive the said rivet extensions of the said cores.

In testimony whereof, I have signed my name to this specification in the presence of two subscribing witnesses, this twenty-seventh day of December 1907.

HARRY C. GRANT.

Witnesses:
FRANK M. ASHLEY,
A. T. SCHARPS.

Correction in Letters Patent No. 931,416.

It is hereby certified that the name of the assignee in Letters Patent No. 931,416, granted August 17, 1909, upon the application of Harry C. Grant, of Bayonne, New Jersey, for an improvement in "Electric Motors," was erroneously written and printed "The Lionell Manufacturing Company" whereas said name should have been written and printed *The Lionel Manufacturing Company;* and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.*